US007853142B2

(12) United States Patent
Meyers et al.

(10) Patent No.: US 7,853,142 B2
(45) Date of Patent: Dec. 14, 2010

(54) SYSTEM AND METHOD FOR AN IMAGING SYSTEM FOR A CONTAINER SECURITY SYSTEM

(75) Inventors: Richard C. Meyers, Longboat Key, FL (US); Roy Smith, Arlington, VA (US)

(73) Assignee: System Planning Corporation, Arlington, VA (US)

( * ) Notice: Subject to any disclaimer, the term of this patent is extended or adjusted under 35 U.S.C. 154(b) by 636 days.

(21) Appl. No.: 11/598,827

(22) Filed: Nov. 14, 2006

(65) Prior Publication Data

US 2007/0133980 A1 Jun. 14, 2007

Related U.S. Application Data

(60) Provisional application No. 60/736,126, filed on Nov. 14, 2005.

(51) Int. Cl.
*G03B 17/48* (2006.01)

(52) U.S. Cl. ........................ 396/429; 396/433; 348/152

(58) Field of Classification Search ................. 396/429; 348/E5.042, 211.13, 61, 82, 151, 211.99, 348/211.3, 152; 250/330
See application file for complete search history.

(56) References Cited

U.S. PATENT DOCUMENTS

| | | | | |
|---|---|---|---|---|
| 4,524,384 | A * | 6/1985 | Lefkowitz et al. | 348/156 |
| 6,778,180 | B2 * | 8/2004 | Howard et al. | 345/581 |
| 6,982,749 | B2 * | 1/2006 | Matsui | 348/218.1 |
| 7,098,784 | B2 | 8/2006 | Easley et al. | |
| 7,123,820 | B2 * | 10/2006 | Shimizu et al. | 386/107 |
| 7,209,035 | B2 * | 4/2007 | Tabankin et al. | 340/539.11 |
| 7,235,775 | B2 * | 6/2007 | Masaki | 250/226 |
| 7,421,112 | B2 * | 9/2008 | Calver et al. | 382/154 |
| 2003/0071743 | A1 * | 4/2003 | Seah et al. | 340/945 |
| 2003/0095185 | A1 * | 5/2003 | Naifeh | 348/156 |
| 2006/0096303 | A1 * | 5/2006 | Kavounas | 62/125 |

* cited by examiner

*Primary Examiner*—Rodney E Fuller
*Assistant Examiner*—Linda B Smith

(57) ABSTRACT

A system for visually capturing and monitoring the contents and events surrounding a cargo container is provided. The system includes an image capture device, a control device, and an image processing device. This system may be used for both visible and infrared images. The image capture device may be situated on the container door, and record images at a more frequent rate if it is determined that an event has occurred based on comparison of successive images. Image compression techniques may also be used to transmit captured and computed images back to a central monitoring station where they can be viewed and further analyzed.

25 Claims, 3 Drawing Sheets

SYSTEM AND METHOD FOR AN IMAGING SYSTEM FOR A CONTAINER SECURITY SYSTEM

CLAIM OF PRIORITY

The present invention claims priority to U.S. Provisional Patent Application No. 60/736,126, filed Nov. 14, 2005.

BACKGROUND OF THE INVENTION

1. Field of the Invention

The present invention relates generally to container security and, more particularly, to a shipping container security system to provide a high degree of confidence regarding the content and security of the container through imaging technology.

2. Background of the Invention

In today's security conscious transportation environment, there is a strong need to cost-effectively and accurately monitor the contents of containerized shipments. This need exist both in the United States and abroad.

Despite the strong need, until recently few solutions, if any, have been able to provide the protection and accuracy needed to suit the transportation industry and the government agencies charged with monitoring shipments. This lack of an acceptable solution is due to many factors which complicate interstate and international shipping. Shipping containers are used to transport most of the commerce entering, leaving, and transiting or moving within the United States. It is estimated that there are over 6 million containers moving in global commerce. Shipping containers have revolutionized the transportation of goods by greatly reducing the number of times goods must be loaded and unloaded during transport. However, at the same time, this same advantage has created a major problem in that it is very difficult to monitor and track the contents of each container during transport.

Beyond their basic construction, monitoring the content of shipping containers is also difficult because these containers are carried through numerous transit points and depots all over the world and it is impractical to stop and check the contents of each container individually at each point of transit. Dealing with this problem, the U.S. Customs Service estimates it can inspect just 5% of the 6 million containers entering and reentering the U.S. each year. Accordingly, agencies such as the United States Customs Service are seeking improved ways to achieve cargo container security and integrity upon arrival at the ports of entry of the United States.

A container security system must have an array of sensors to monitor many different tampering events. Typical sensors may be acoustic or vibration, temperature, light, and GPS location. Other more sophisticated sensors may include infrared or heat, chemical, biological, or even radiation sensors. In spite of the number and sophistication of these sensors, the basic question of what is actually happening in and around a container may not be exactly ascertained without a visual image.

As solid state imaging devices become ubiquitous, the cost of these devices is becoming so low that they may now be used for many applications where only a few years ago the expense was entirely prohibitive. CCD (charge coupled device) and CMOS (complementary metal oxide semiconductor) image sensors are two different technologies for capturing images digitally. Each has unique strengths and weaknesses giving advantages in different applications. One interesting bi-product of many of these devices is their ability to operate below the visible spectrum into the infrared (IR) region as well. This can be readily seen by holding up a cell phone camera to an IR TV remote control and seeing the LED flash in the camera when it cannot be seen by the naked eye.

One of the key advantages of an image capture system is to allow images to be sent to a remote location or monitoring station for examination action. However, due to the power limitations of container monitoring systems, the communication channels are frequency narrowband and in the range of a few bytes per day at the low end to a few thousand bit per second at the high end. For this reason it may be useful to apply image compression to the captured images prior to transmission.

DESCRIPTION OF THE RELATED ART

A container security system as described by System Planning Corporation (SPC) (U.S. Pat. No. 7,098,784) herein referred to as "the SPC Invention", performs many of the functions to monitor containers, their content, and to detect tampering within a container during transit. This is accomplished through a device is which located on a container, which performs multiple functions. Some of these functions may include controlling various sensors, collecting the data from these sensors and transmitting this data back to a central monitoring station. The central monitoring station may also send commands and information to individual containers equipment with this device.

To enable information to be transmitted to and from the container, there are several communications subsystems including a satellite or cellular communications device, or both. The SPC invention also describes the utilization of a global positioning element, and short range wireless or local area communication channel to communicate with various sensors and other elements within the container.

A limitation of the SPC invention is that the array of sensors typically does not include an actual image capture or camera device, either in the visible or infrared spectrum. This device would be particularly useful as it may be able to capture images and perform other image processing which would greatly enhance the integrity of the security system.

SUMMARY OF THE INVENTION

To address the problems and limitations noted above, a system for monitoring the contents of a closed container is provided.

An imaging system monitors the contents and events of a cargo container. The imaging system may include: an image capture device which may be mounted on the container door; a control element for controlling the image capture device and analyzing received image data; and an image processing element to run certain algorithms which may assist in a machine interpretation of the captured image data. In the preferred embodiments, the image capture device is suitable to capture images in the visible light spectrum as well as in the infrared light spectrum. The control element may utilize a microprocessor and non-volatile memory, as well as a communications element capable of communication outside of the imaging system. The image processing element may perform its functions on a separate digital signal processor, or perform these functions as combined with the control element.

The container imaging system captures and stores images on a periodic basis. The images are compared and the system monitors the ambient condition for certain changes in the visible or infrared field, at which time the device may capture and store images at a more frequent rate for a relatively short period of time. In another preferred embodiment the imaging system compresses the images prior to them being sent to a remote location.

DESCRIPTION OF THE PREFERRED EMBODIMENTS

The present invention provides a unique container imaging system for monitoring and reporting environmental information and events relating to a shipping container. Throughout this specification, preferred embodiments of the invention are described in detail below with reference to the accompanying drawings. In the embodiments, various examples and illustrative embodiments are provided. It should be understood that these embodiments and examples are provided purely for purposes of illustration. The present invention is limited solely by the claims appended hereto.

A preferred embodiment of the present invention includes a solid state image sensor technology as part of a container security system. Not only can the device detect the binary condition of the container door being opened as would a light sensor, but it is also able to capture image information relating to the person(s) or other events such as opening the container door, and the insertion or removal of any cargo. Should a door be opened, the image sensor may capture and store frames for several seconds for subsequent retrieval.

Figure 1:
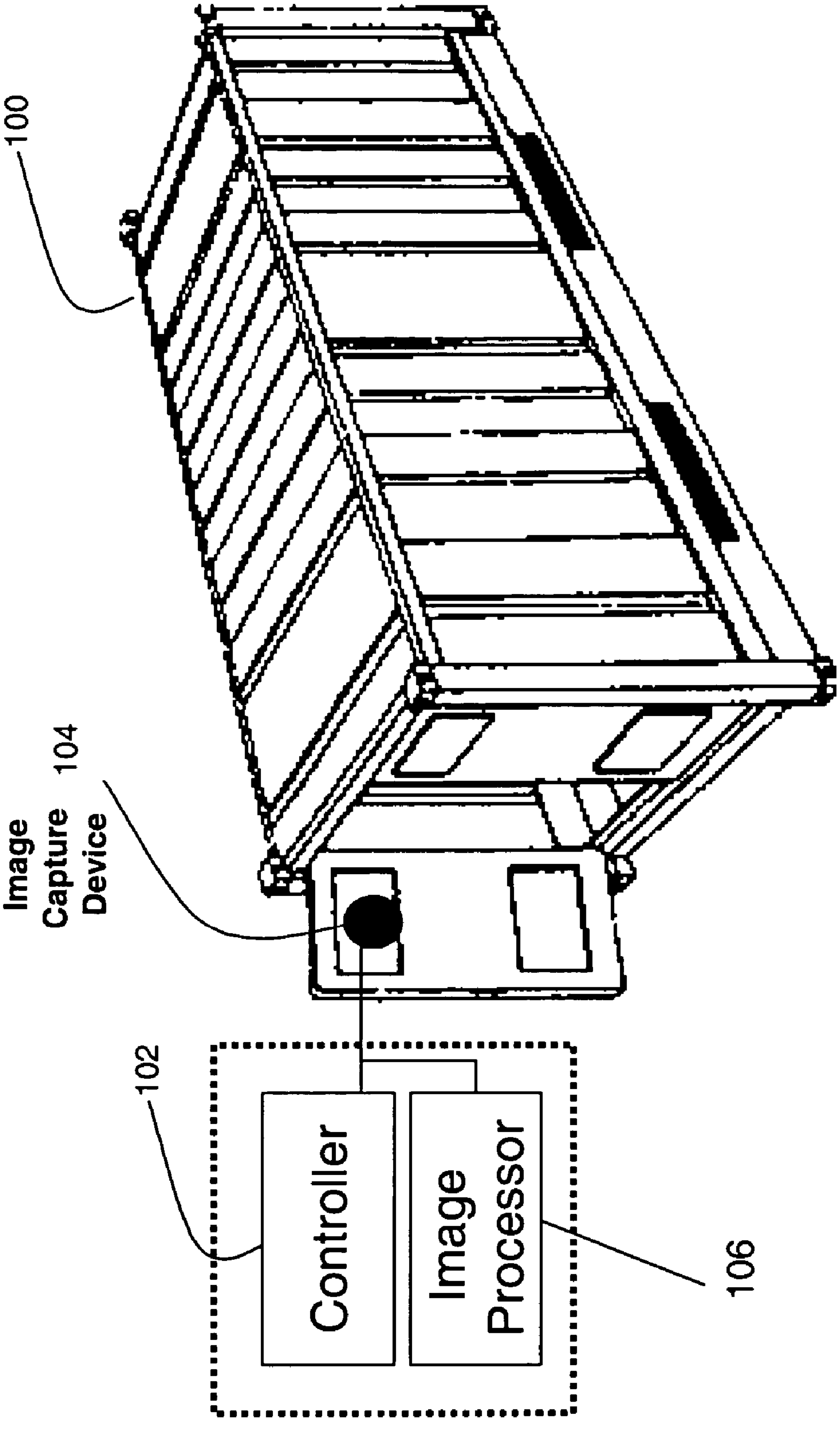
FIG. 1 shows a functional configuration and example of placement of the container imaging system in the container security application.

With reference now to FIG. 1, and for the purposes of explanation, the container imaging system monitoring the contents and events of a cargo container of the present invention may be affixed to a container 100, and may include three elements. These elements may include an image capture device 104, a control element 102 for controlling the image capture function and analyzing received image data, and an image processing element 106 to run certain algorithms which may assist in a machine interpretation of the captured image data. In the embodiments of the present invention, the image capture device 104 may be a CCD (charge coupled device), a CMOS (complementary metal oxide semiconductor), or another solid state image capture device of a different fabrication technology suitable for this application. The image capture device 104 may be suitable to capture images in the visible light spectrum with wavelengths from approximately 700 nanometers to 400 nanometers, or may capture images in the infrared light spectrum with wavelengths from approximately values greater that 700 nanometers to approximately 1 millimeter.

Figure 2:
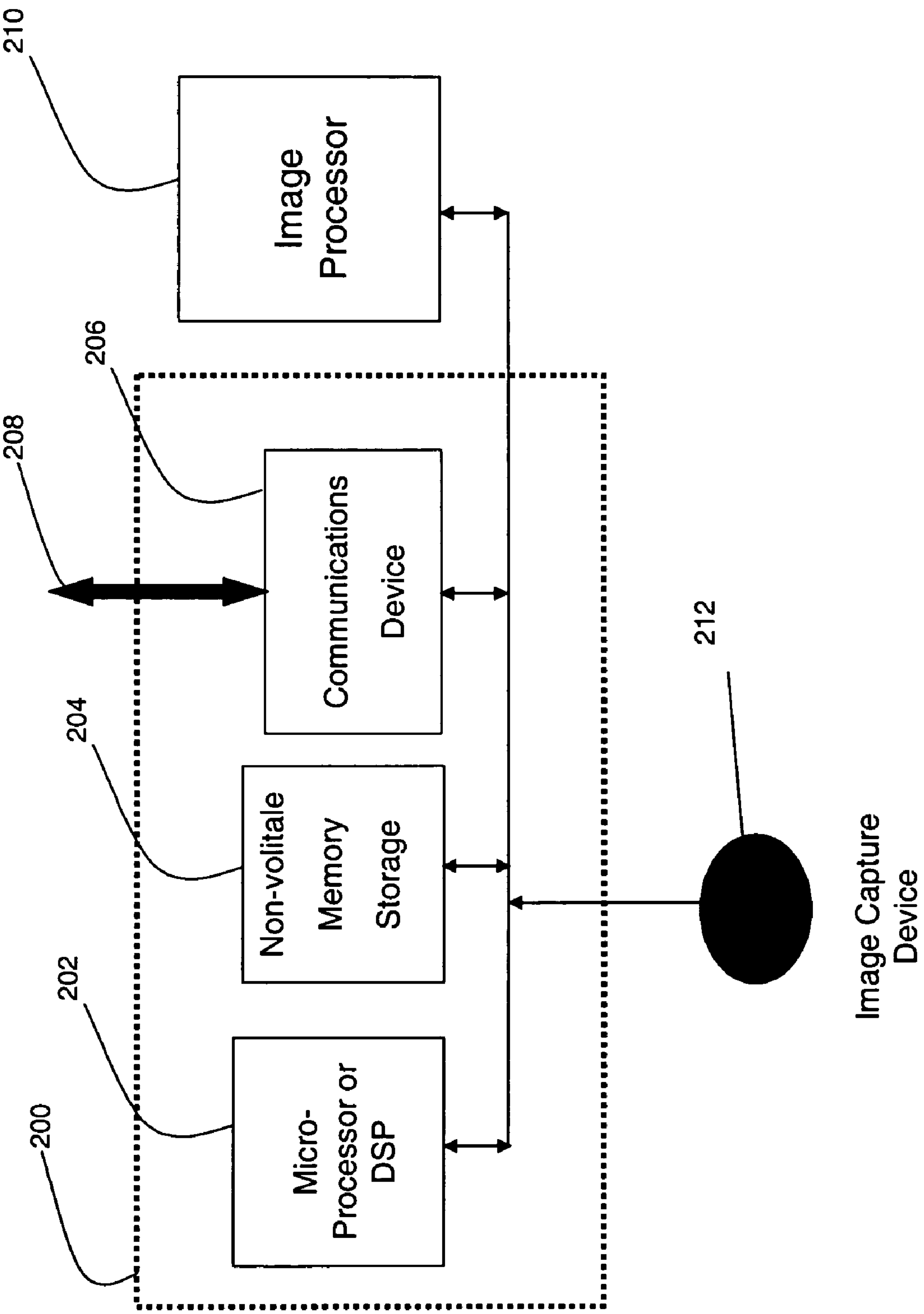
FIG. 2 shows a block diagram of the various functional elements of the container imaging system.

As provided in the example in FIG. 2, the preferred embodiments of the preset invention may also include a control element 200 comprising a micro-processor element 202, a non-volatile memory storage element 204 capable of storing multiple images captured by the image capture device, and a communications element 206. The communication element 206 may be of any wired or wireless communications device which is capable of receiving command messages, and reporting events, status, and captured images to other control or communications components via an interface 208 outside the image capture system. For example purposes only, the communications element 206 may be a serial port controlled by a micro processor, or a short range wireless interface such as Bluetooth or Zigbee. The control element 200 may be a stand alone functional unit, or the functions of the control element 200 may be performed on a device which is shared among other multiple control and processing functions for the container monitoring and security system. Some examples of these may be a processor which is receiving data from other sensors or a satellite communications controller device.

The image processing element 210 may be a digital signal processor device or other computing element capable of performing simple image processing functions. Alternatively, the image processing element 210 may be able to be combined with the microprocessor element 202, as the image processing computational bandwidth and real-time requirements may not be substantial as to require a dedicated digital signal processor.

Again with reference to FIG. 1, in one preferred embodiment of the present invention, the image capture device 104 may be mounted on the door. This location may be preferable as when the container is opened the image capture device 104 will be most likely to activate, as well as record the images of any activity at the door opening where contents are most likely to be removed or added. However, in certain applications it may be preferable to locate the image capture device in an alternate location. The control element 102 and image processing element 106 may be co-located by the image sensor, or be situated in an area with other electronics for the container monitoring and security system such as the sensor or communications processor.

Another preferred embodiment of the present invention includes the ability to monitor infrared and visual images using the same device. During the day a container may heat up quite significantly as the ambient temperature rises. As this occurs heat from the container walls may transfer to the interior air, and then to the contents. When evening falls the temperature may become lower and the heat stored in the contents may dissipate. The resultant temperature gradient effect may be captured by the image sensor as an infrared image of the container contents over time. The periodic capture of this image and comparison of sequential frames over a period of time may yield a determination of whether any of the contents of the container has been moved. Likewise, a rise in temperature of any of the contents above a certain predefined level may indicate hazardous or hostile contents which would require marking for further inspection.

Figure 3:
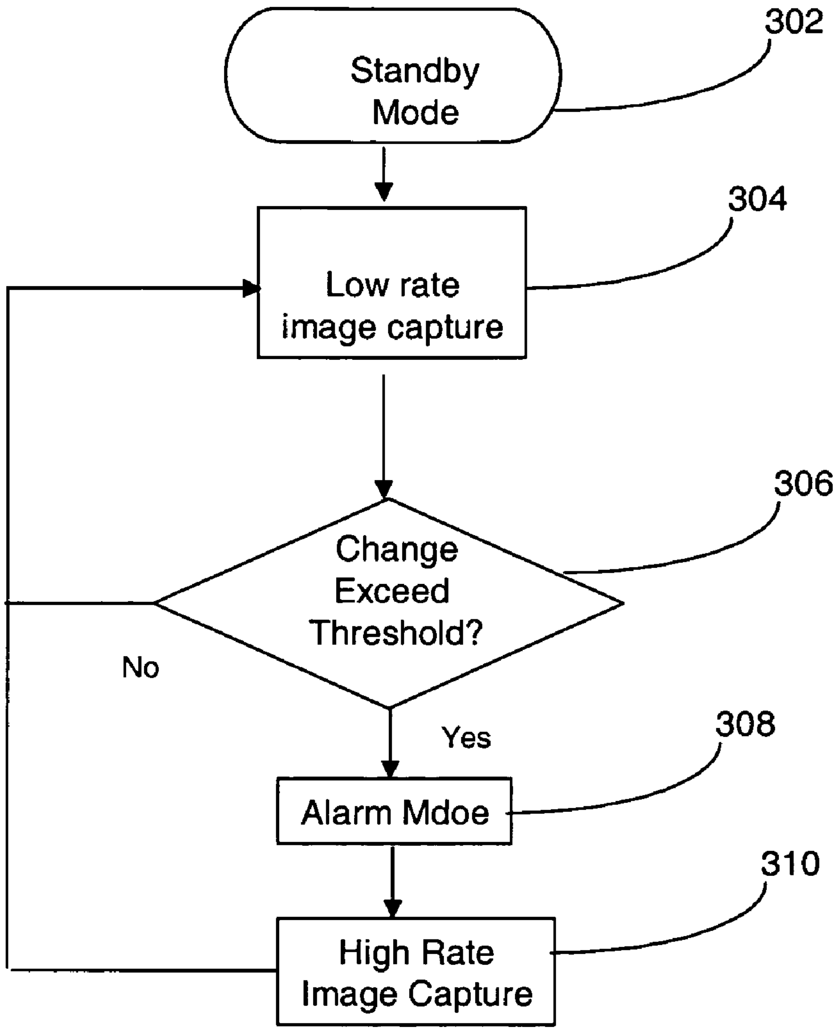
FIG. 3 shows a method of image capture during a standby mode and alarm mode.

As a preferred embodiment of the present invention, during normal operation as shown in FIG. 3, the system is in standby mode at 302. During this time images are captured and stored on a periodic basis in step 304, but relatively infrequently. For example, depending on the application and system power availability, an image may be captured every few minutes, or every few hours. However, in step 306, the container imaging system continuously monitors with frequent sampling. If the image capture device senses a change in the visible or infrared light which exceeds a predetermined threshold over a fixed period of time in step 308, the system may transition into an alarm mode. In this mode of the system, the control element commands the image capture device to capture and store images at a more frequent rate for a relatively short period of time 312. For example if the image capture device were to desire to capture a person opening the door and removing an item, it would record images several times per second to every few seconds. Following a short period of rapid image capture, the device will transition back to standby mode 302.

In the preferred embodiment of the present invention, the container imaging system averages images, and at predetermined periodic times, compares successive captured images. The image processing device may compare and correlate successively captured images to determine if image pixel averages exceed a predetermined gradient threshold. If the gradient threshold has been exceeded, the image processing device may send a report back to the control element indicated an alarm condition has occurred, and may also report back a resultant image which represents the specific areas of view where the gradient threshold has been exceeded. Since embodiments of the present invention comprise using image processing algorithms in the container security application, as opposed to the algorithms themselves, the mathematics and other specifics in these algorithms are not described in details herein. Examples of suitable algorithms may be found for example in the text "Digital Image processing", by Rafael C. Gonzalez, Richard E. Woods, which is hereby incorporated by reference.

Another preferred embodiment of this invention is to utilize a method for compressing the captured and resultant images. In this case the image processing element may utilize a conventional image compression technique to render these images suitable for transmission over a narrow band communications channel. There are many suitable image compression techniques which may be used depending on the specific container security application. Most of the image compression algorithms result in a trade-off between image quality and image size. For example, in container monitoring systems with a very low rate communications channel to a central monitoring station, a much higher compression technique may be used.

What is claimed is:

1. An imaging system for monitoring contents of and events surrounding a cargo container, the system comprising:

an image capture device for capturing images and receiving image data;

an image processing element, wherein the image processing element is configured to analyze images to determine changes in visible or infrared light which exceed a predetermined threshold over a fixed period of time, and a control element, wherein the control element is configured to command the image capture device to capture and store images at a more frequent rate for a relatively short period of time based on whether changes in the visible or infrared light exceed a predetermined threshold over a fixed period of time.

2. The system of claim 1, wherein the image capture device comprises a CCD (charge coupled device), a CMOS (complementary metal oxide semiconductor).

3. The system of claim 2, wherein the image capture device captures images in the visible light spectrum with wavelengths from approximately 700 nanometers to 400 nanometers.

4. The system of claim 2, wherein the image capture device captures images in the infrared light spectrum with wavelengths from approximately at values greater that 700 nanometers to approximately 1 millimeter.

5. The system of claim 1, wherein the control element comprises:

a microprocessor element;

a non-volatile memory storage element capable of storing multiple images captured by the image capture device;

a communications element capable of receiving command messages, and reporting events, status, and captured images to other control or communications components outside the image capture system.

6. The system of claim 5, wherein the control element functions may be performed on a device which is shared among other multiple control and processing functions for the container monitoring and security system.

7. The system of claim 1, wherein the image processing element comprises a digital signal processor clement capable of performing simple image processing.

8. The system of claim 7, wherein the image processing functions may be performed on the same physical device as the control element.

9. The system of claim 1, wherein the image capture device is mounted on the interior side of the container door.

10. The system of claim 1, wherein the control element arid image processing element are co-located by the image sensor, or situated in a area with other electronics for the container monitoring and security system.

11. A method for capturing images in a container system comprising:

placing a container imaging system in standby mode;

implementing a control element for commanding an image capture device to capture and store images on a periodic basis;

if the image capture device senses a change in the visible or infrared light which exceeds a predetermined threshold over a fixed period of time, transitioning into alarm mode and implementing the control element to command the image capture device to capture and store images at a more frequent rate for a relatively short period of time.

12. A method for comparing successive captured images in a container security system during a standby mode comprising:

comparing and correlating successively captured images with an image processing device to determine if image pixel averages exceed a predetermine gradient threshold;

if the gradient threshold has been exceeded, sending a report from the image processing device back to a control element indicating an alarm condition has occurred, and reporting back a resultant image representing specific areas of view where the gradient threshold has been exceeded.

13. The method of claim 12, wherein the method is performed for both visible and infrared captured images.

14. The method of claim 13, further comprising compressing images to render the images suitable for transmission over a narrowband communication channel.

15. The method of claim 12, wherein the successive images are comprised of infrared images and further wherein at least one image is taken at a time of higher heat intensity within the container.

16. An imaging system for monitoring contents of and events surrounding a cargo container, the system comprising:

an image capture device for capturing images and receiving image data;

an image processing element, wherein the image processing element is configured to analyze images to determine if image pixel averages exceed a predetermine gradient threshold, and a control element, wherein the control element is configured to respond to a measurement exceeding the predetermined gradient threshold by directing the image capture device to capture further images of specific areas of view where the gradient threshold has been exceeded.

17. The system of claim 16, wherein the image capture device comprises a CCD (charge coupled device), a CMOS (complementary metal oxide semiconductor).

18. The system of claim 17, wherein the image capture device captures images in the visible light spectrum with wavelengths from approximately 700 nanometers to 400 nanometers.

19. The system of claim 17, wherein the image capture device captures images in the infrared light spectrum with wavelengths from approximately at values greater that 700 nanometers to approximately 1 millimeter.

20. The system of claim 16, wherein the control element comprises:

a microprocessor element;

a non-volatile memory storage element capable of storing multiple images captured by the image capture device;

a communications element capable of receiving command messages, and reporting events, status, and captured images to other control or communications components outside the image capture system.

21. The system of claim 20, wherein the control element functions may be performed on a device which is shared among other multiple control and processing functions for the container monitoring and security system.

22. The system of claim 16, wherein the image processing element comprises a digital signal processor clement capable of performing simple image processing.

23. The system of claim 22, wherein the image processing functions may be performed on the same physical device as the control element.

24. The system of claim 16, wherein the image capture device is mounted on the interior side of the container door.

25. The system of claim 16, wherein the control element arid image processing element are co-located by the image sensor, or situated in a area with other electronics for the container monitoring and security system.

* * * * *